United States Patent Office 3,027,238
Patented Mar. 27, 1962

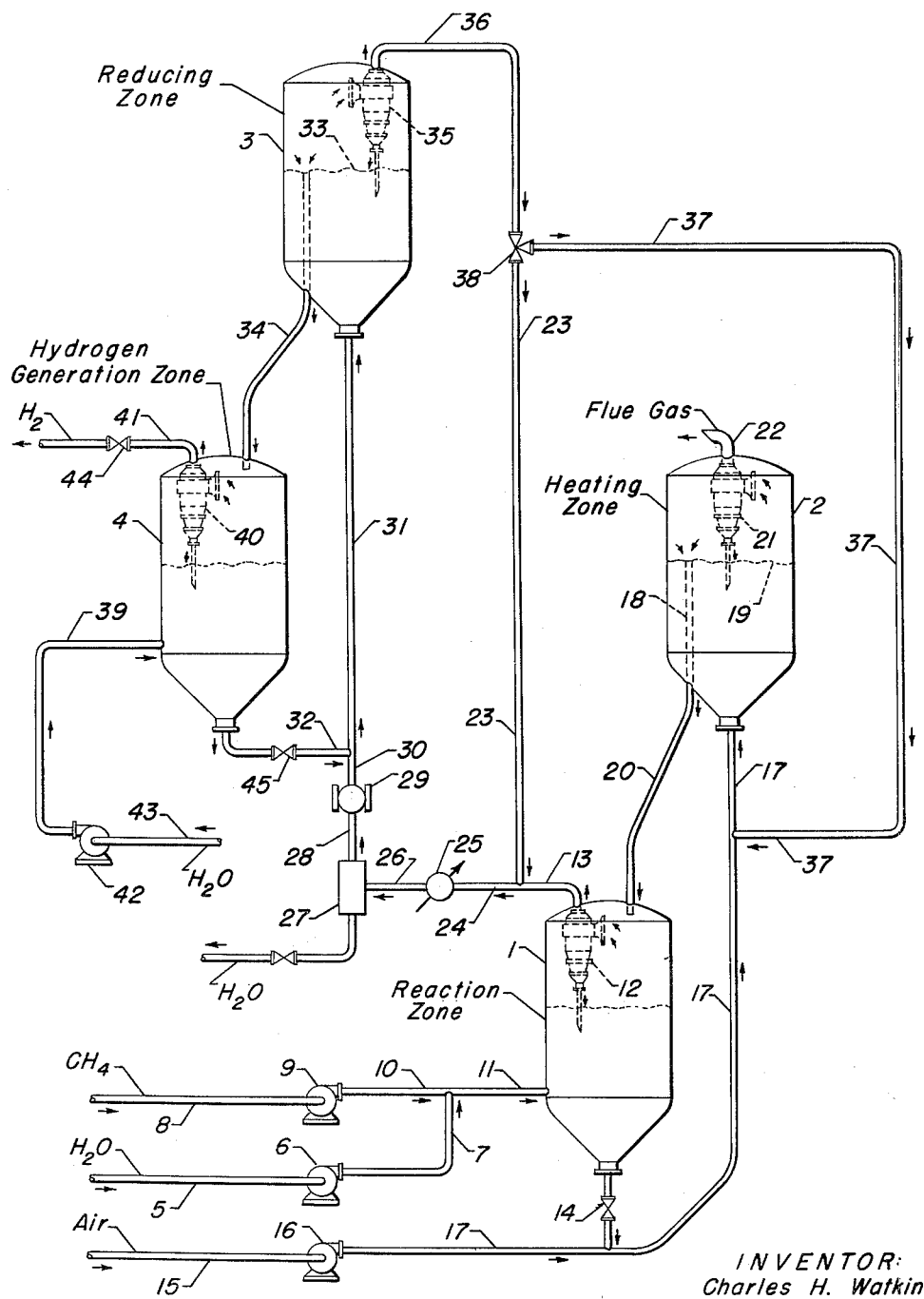

3,027,238
HYDROGEN MANUFACTURE
Charles H. Watkins, Arlington Heights, Ill., assignor to Universal Oil Products Company, Des Plaines, Ill., a corporation of Delaware
Filed Dec. 7, 1959, Ser. No. 857,956
3 Claims. (Cl. 23—212)

This invention relates to an improved and continuous process for the preparation of hydrogen in a fluidized solids system. In particular it relates to an improved modification of the process for the generation of hydrogen through the reduction of steam by suitable metals or metal oxides.

Catalytic hydrogenation has found extensive application in industrial processes. Large quantities of hydrogen are consumed in the manufacture of a variety of highly useful materials such as ammonia, methanol, liquid fuels, oxygenated compounds, hydrogenated vegetable oils, and a number of organic chemicals. Further, the demand for hydrogen in the processing of petroleum is constantly increasing and in the future additional quantities will be demanded for the hydrogenation of residual oils and coal to produce fuels and chemicals.

In the development and operation of processes involving hydrogenation the problem of hydrogen supply is important. The hydrocarbon oils and gases which are readily and extensively available as a result of petroleum processing are a logical source of hydrogen, and a number of processes have been designed for the conversion of petroleum hydrocarbons to hydrogen.

In the preparation of hydrogen by the reaction of steam with hydrocarbons a considerable expense is involved in the separation of carbon oxides from the hydrogen product. This is generally accomplished by the inclusion of additional process equipment wherein the carbon monoxide is converted to carbon dioxide and the latter absorbed in an alkaline solvent.

On the other hand relatively pure hydrogen has been produced by the steam-iron process wherein steam is reduced by a metal or a metal oxide, such as iron or ferrous oxide, at an elevated temperature with the formation of said hydrogen and oxides of iron. The iron oxides are subsequently subjected to a reducing gas thereby preparing the iron for reuse in the process. This process has not been widely accepted in industry due to unfavorable economics which can be attributed to poor utilization of the steam reducing agent available to the process. This is largely overcome by the process of the present invention.

It is an object of this invention to present an improved and continuous process for the production of high purity hydrogen by the reduction of steam by a metalliferous steam reducing agent.

Another object of the present invention is to obtain the aforementioned high purity hydrogen in increased yields by the utilization, as a reducing gas, of the gaseous products resulting from the reaction of steam with hydrocarbons, in a manner such as to effect substantially complete reduction of said metalliferous steam reducing agent.

In its broadest aspect this invention embodies a continuous process for the preparation of hydrogen which comprises charging steam and a hydrocarbon to a reaction zone, reacting said steam and hydrocarbon therein at an elevated temperature in the presence of catalytic particles forming thereby coke-laden catalytic particles and a gaseous mixture comprising hydrogen and carbon monoxide, continuously withdrawing said gaseous mixture for use as a reducing gas as hereinafter set forth, continuously withdrawing said coke-laden catalytic particles from said reaction zone and passing said particles to a heating zone, in the presence of an oxygen-containing gas, heating said catalytic particles in said heating zone to an elevated temperature by burning the coke therefrom in the presence of a combustible gas mixture formed as hereinafter set forth, discharging the resulting flue gas, returning the hot, coke-free catalytic particles to said reaction zone maintained at an elevated temperature by the passage of the hot particles therethrough, continuously passing the aforementioned reducing gases to a reducing zone and contacting said gases therein with particles comprising an oxide of a metalliferous steam reducing agent at an elevated temperature thereby reducing said particles to a lower state of oxidation, continuously withdrawing the partially spent reducing gases from said reducing zone to be utilized as hereinafter described, passing the last mentioned particles to a hydrogen generation zone wherein they are contacted with steam continuously charged to said hydrogen generation zone, reacting said steam and said particles therein at an elevated temperature to form hydrogen and higher oxides of said metalliferous steam reducing agent, recovering the hydrogen product from said hydrogen generation zone, withdrawing said particles in a higher oxidation state and returning them to said reducing zone to further contact reducing gases as previously described, passing the partially spent reducing gases to said heating zone in combination with an oxygen-containing gas to form the aforesaid combustible gas mixture, and recycling excess partially spent reducing gases through the reducing zone in combination with the aforesaid reducing gases from the reaction zone to be further utilized as a reducing gas.

Further objects and advantages of the present invention will become apparent in the following detailed description of the process setting forth the preferred operating ranges in respect to temperatures, pressures, and flow rates. The description is presented in the form of an example and will be more readily understood by reference to the attached schematic drawing of the process.

As illustrated by the attached schematic drawing, this invention embodies a four zone process which zones have been designated as reaction zone 1, heating zone 2, reducing zone 3, and hydrogen generation zone 4. The hydrocarbon charge is introduced by means of line 8 and is charged to the lower section of the reaction zone 1 by means of pump 9 through line 10 and line 11. The hydrocarbon charge may comprise a normally gaseous hydrocarbon such as natural gas, methane, ethane, propane, butane, etc., or liquid hydrocarbons such as gasolines, naphthas, kerosenses, gas oils, light vacuum gas oils, heavy vacuum gas oils, fuel oils, diesel fuels, etc. In the further description of this process natural gas is utilized as the hydrocarbon charge and is charged as set out above at a rate of about 400,000 s.c.f./hour.

The natural gas enters the lower section of reaction zone 1 in admixture with steam introduced through line 5 and charged through line 7 by pump 6 at a rate of about 20,000 pounds per hour. The steam-natural gas mixture so charged to the reaction zone 1 passes upwardly therein in contact with a counter flow of hot catalytic particles by means of which the reaction zone temperature is maintained at from about 1000° F. to about 1800° F., and preferably from about 1300° F. to about 1500° F. The steam is thereby reacted with the natural gas at a pressure of from about atmospheric to about 45 p.s.i. or more to form the gaseous reaction products hereinafter described. The aforementioned catalytic particles may comprise finely divided microspheres or be in a crushed powdered form which permit a fluidized type of contact, or alternatively, the particles may be somewhat larger, being of small pellet or microsphere form which will permit a moving bed type of operation. The present schematic drawing indicates a fluid type of operation. By way of illustration of the process of this invention, said particles may comprise a metal of the iron group, i.e., nickel, iron, cobalt, as the catalytic element. Said catalytic element can be utilized per se, however, it is preferred that it be supported on a suitable base such as alumina, silica, zirconia, thoria, boria, etc., or composites thereof such as silica-alumina, silica-zirconia, etc. In the present example nickel on a silica-alumina base is utilized.

The gaseous product resulting from the reaction of steam and natural gas passes upwardly through particle separator 12 and exits from the reaction zone 1 via line 13 to be further utilized as hereinafter set forth. Said gaseous reaction product will hereinafter be referred to as fresh reducing gas. In the present example said fresh reducing gas is withdrawn from the reaction zone 1 at a rate of about 1,640,000 s.c.f./hour and comprises:

|  | Percent |
|---|---|
| $CO$ | 19.0 |
| $CO_2$ | 4.2 |
| $H_2$ | 74.4 |
| $CH_4$ | 1.8 |
| $N_2$ | 0.6 |

The resulting coke-laden catalytic particles move downwardly through reaction zone 1 passing therefrom through control valve 14 at a controlled rate, in this instance about 169 t. per hour. Said coke-laden particles are thereafter conveyed to the lower section of a heating zone 2 via line 17 by an oxygen-containing gas, such as air, introduced through line 15 and charged through pump 16 at a rate of about 120,000 s.c.f./hour in this particular example. In this manner the coke on said coke-laden particles is partially oxidized prior to entry into said heating zone 2. The coke is further burned from said coke-laden particles in said heating zone 2 in the presence of a combustible gas mixture, formed as hereinafter set forth, and the temperature of said particles is thereby raised to a temperature of from about 1200° F. to about 1900° F. or more, however, it is preferred to maintain the temperature within the more restricted range of from about 1500° F. to about 1700° F. The heating zone is operated at a pressure of from about atmospheric to about 45 p.s.i. although pressures considerably in excess of this are operable. For reasons of process control it is generally preferred to maintain the pressure at about 15 p.s.i. less than that maintained in the reaction zone.

The hot catalytic particles pass upwardly through said heating zone 2 in an agitated state so maintained by the concurrent flow of gases therethrough, said gases being discharged as flue gases through particle separator 21 and line 22. The upward flow of the catalytic particles is terminated at a level 19 determined by standpipe 18. Hot, coke-free, catalytic particles pass downwardly through said standpipe 18 and exit from the heating zone 2 through line 20 to reenter the reaction zone in contact with a countercurrent flow of a steam-hydrocarbon mixture to repeat the above described cycle.

In this phase of the process such sulfur impurities as may have been introduced with the hydrocarbon charge stock react with the catalytic particles to form metal sulfides and as such are carried to the heating zone wherein they are oxidized and discharged as sulfur oxides with the flue gases.

While the drawing indicates an upward fluidized flow of catalytic particles in the heating zone 2, it is also contemplated, as hereinbefore set forth, that a moving bed operation will perform the same function though not necessarily with equivalent results, in which case the coke-laden particles would enter the upper section of heating zone 2 and be allowed to descend in a relatively compact moving bed in contact with a countercurrent flow of air and thereafter exit from the bottom of said heating zone 2 through line 20 in a manner eliminating the need for standpipe 18.

The aforementioned fresh reducing gases exiting from the reaction zone 1 via line 13 are supplemented by partially spent reducing gases introduced through line 23 and formed as hereinafter described. The combined reducing gases then pass by way of line 24 through a heat exchanger 25 passing by way of line 26 to a separator 27 wherein water is removed from said reducing gases. The dried reducing gases pass through line 28 in the example of this invention at a rate of about 2,120,000 s.c.f./hour. Said reducing gases are charged through line 30 by means of compressor 29. In addition to acting as a reducing gas said gases are utilized as a lifting gas. Thus, particles comprising an oxide of a metalliferous steam reducing agent, hereinafter described, are withdrawn from the hydrogen generation zone 4 through line 32 containing control valve 45 and thereafter carried to reducing zone 3 by way of conduit 31 and by means of said reducing gas.

The particles above referred to as a metalliferous steam reducing agent may comprise a metal or a combination of metals located above hydrogen in the electromotive series. These metals include lead, tin, nickel, cobalt, cadmium, iron, chromium, zinc, manganese, aluminum, beryllium, magnesium, calcium, barium, strontium, sodium, postassium, rubidium, and lithium. It is generally preferred to employ nickel, cobalt or iron, or mixtures thereof since the reaction rates of said metals with steam and the comparative ease with which their resulting oxides are reduced make them particularly suitable to the process of this invention. However, it is not intended to restrict the process of this invention to the aforementioned metals as the process is operable with the metalliferous steam reducing agents set out in the broader description above. Further, it is preferred that said metalliferous steam reducing agent be supported on a suitable base such as alumina, silica, zirconia, thoria, boria, etc., or combinations thereof such as silica-alumina, silica-zirconia, silica-alumina-zirconia, etc.

In the present example said metalliferous steam reducing agent comprises 20% iron on a silica-alumina base and is circulated at a rate of about 1100 t./hour.

Thus, the particles entering the lower section of said reducing zone 3 comprise an oxide of iron in a particulate form. Said particles enter the reducing zone and continue contact with the aforesaid reducing gases and pass upwardly concurrently therewith at a temperature of from about 1000° F. to about 1800° F., or more preferably from about 1300° F. to about 1500° F. The particles comprising oxides of iron are thereby subjected to substantially complete reduction and, upon reaching a predetermined level 33 established by standpipe 34, pass from said reducing zone in a reduced state by way of standpipe 34 to enter the upper section of said hydrogen generation zone 4. The pressure of said reducing zone is generally maintained at about 15 p.s.i. less than the hydrogen generation zone for reasons of process control.

The partially spent reducing gases pass upwardly through the reducing zone 3 and exit therefrom through particle separator 35 and line 36. In the present example said partially spent reducing gases are withdrawn at a rate of about 2,120,000 s.c.f./hour and comprise:

|  | Percent |
|---|---|
| $CO$ | 15.0 |
| $CO_2$ | 8.2 |
| $H_2$ | 49.4 |
| $CH_4$ | 1.8 |
| $N_2$ | 0.6 |

The partially spent reducing gases pass through valve 38 to line 37 and are thereafter combined with air introduced through line 17 to form the aforementioned combustible gas mixture as fuel for the process. In this particular instance about 1,590,000 s.c.f./hour of partially spent reducing gases are passed through line 37 to be combined with about 120,000 s.c.f./hour of air. The excess partially spent reducing gases pass through valve 38 and through line 23 to combine with fresh reducing gases exiting from the reaction zone 1 through line 13 to form the combined reducing gases as previously described. In the present example said excess partially spent reducing gases are recycled at the rate of about 530,000 s.c.f./hour.

The iron-containing particles from the reducing zone 3 enter the hydrogen generation zone 4 and contact therein a counter flow of steam introduced to the lower section of the hydrogen generation zone 4 from line 43 through line 39 by pump 42, in this example, at a rate of about 23,200 lbs./hr. The steam is thereby reacted with said iron-containing particles at a temperature of from about 800° F. to about 1700° F. to form hydrogen and higher oxides of said particles. A temperature within the narrower range of from about 1000° F. to about 1500° F. is preferred in this phase of the process. The hydrogen generation zone is operated at a pressure of about atmospheric to about 45 p.s.i. although pressures in excess of this are operable. The hydrogen product and excess steam pass upwardly through particle separator 40 and exit through line 41 to be recovered by conventional methods. The hydrogen recovery in the current example is about 476,000 s.c.f./hour of 99.7% purity.

The iron-containing particles pass downwardly in a state of higher oxidation and are withdrawn from the lower section of the hydrogen generation zone 4 through control valve 45 and line 32 to be returned to the reducing zone 3 as previously shown.

That portion of the process comprising the hydrogen generation zone 4 and the reducing zone 3 is essentially isothermal. The reduction of the metalliferous steam reducing agent in the reducing zone 3 is slightly exothermic and the oxidation of said metalliferous steam reducing agent in the hydrogen generation zone 4 is endothermic by approximately the same amount. Therefore, by appropriately preheating the feed gases to these two zones by conventional heat exchange methods, no additional heat need be supplied. For example, such preheat may be supplied by the hot flue gases expelled from the heating zone 2.

Pressures ar generally not considered to be an important variable in this process except insofar as necessary to maintain a proper flow of solids through the system. In general, the process is operated at pressures of from about atmospheric to about 45 p.s.i. However, pressures considerably in excess of these can be employed if it is so desired, and it is not intended to so restrict the process of this invention.

I claim as my invention:

1. A continuous process for the preparation of hydrogen which comprises charging steam and a hydrocarbon to a reaction zone, reacting said steam and hydrocarbon therein at an elevated temperature in the presence of catalytic particles, forming thereby coke-laden catalytic particles and a gaseous mixture comprising hydrogen and carbon monoxide, continuously withdrawing said gaseous mixture for use as a reducing gas as hereinafter set forth, continuously withdrawing said coke-laden catalytic particles from said reaction zone and passing said particles to a heating zone in the presence of an oxygen-containing gas, heating said catalytic particles in said heating zone to an elevated temperature by burning the coke therefrom in the presence of a combustible gas mixture formed as hereinafter set forth, discharging the resulting flue gas, returning the hot, coke-free catalytic particles to said reaction zone maintained at an elevated temperature by the passage of the hot particles therethrough, continuously passing the aforementioned reducing gases to a reducing zone and contacting said gases therein with particles comprising an oxide of a metalliferous steam reducing agent at an elevated temperature thereby reducing said particles to a lower state of oxidation, continuously withdrawing the partially spent reducing gases from said reducing zone to be utilized as hereinafter described, passing the last mentioned particles to a hydrogen generation zone wherein they are contacted with steam continuously charged to said hydrogen generation zone, reacting said steam and said particles therein at an elevated temperature to form hydrogen and higher oxides of said metalliferous steam reducing agent, recovering the hydrogen product from said hydrogen generation zone, withdrawing said particles in a higher oxidation state and returning them to said reducing zone to further contact reducing gases as previously described, passing a portion of the partially spent reducing gases to said heating zone in combination with an oxygen-containing gas to form the aforesaid combustible gas mixture, recycling excess partially spent reducing gases through the reducing zone in combination with the aforesaid reducing gases from the reaction zone to be further utilized as a reducing gas, and preheating the feed gases to said reducing zone and said hydrogen generation zone by heat exchange with hot flue gas from said heating zone sufficiently to maintain the portion of the process comprising the reducing and hydrogen generation zones essentially isothermal.

2. A continuous process for the preparation of hydrogen which comprises charging steam and a hydrocarbon to a reaction zone, reacting said steam and hydrocarbon therein at a temperature of from about 1000° F. to about 1800° F. in the presence of catalytic particles, forming thereby coke-laden catalytic particles and a gaseous mixture comprising hydrogen and carbon monoxide, continuously withdrawing said gaseous mixture for use as a reducing gas as hereinafter set forth, continuously withdrawing said coke-laden catalytic particles from said reaction zone and passing said particles to a heating zone in the presence of an oxygen-containing gas, heating said catalytic particles in said heating zone to a temperature of from about 1200° F. to about 1900° F. or more by burning the coke therefrom in the presence of a combustible gas mixture formed as hereinafter set forth, discharging the resulting flue gas, returning the hot, coke-free catalytic particles to said reaction zone maintained at an elevated temperature by the passage of the hot particles therethrough, continuously passing the aforementioned reducing gases to a reducing zone and contacting said gases therein with particles comprising an oxide of a metalligerous steam reducing agent at a temperature of from about 1000° F. to about 1800° F. thereby reducing said particles to a lower state of oxidation, continuously withdrawing the partially spent reducing gases from said reducing zone to be utilized as hereinafter described, passing the last mentioned particles to a hydrogen generation zone wherein they are contacted with steam continuously charged to said hydrogen generation zone, reacting said steam and said particles therein at a temperature of from about 800° F. to about 1700° F. to form hydrogen and higher oxides of said metalliferous steam reducing agent, recovering the hydrogen product from said hydrogen generation zone, withdrawing said particles in a higher oxidation state and returning them to said reducing zone to further contact reducing gases as previously described, passing a portion of the partially spent reducing gases to said heating zone in combination with an oxygen containing gas to form the aforesaid combustible gas mixture, recycling excess partially spent reducing gases through the reducing zone in combination with the aforesaid reducing gases from the reaction zone to be further utilized as a reducing gas, and preheating the feed gases to said reducing zone and said hydrogen generation zone by heat exchange with hot flue gas from said heating zone sufficiently to maintain the portion of the process comprising the reducing and hydrogen generation zones essentially isothermal.

3. A continuous process for the preparation of hydrogen which comprises charging steam and a hydrocarbon to a reaction zone, reacting said steam and hydrocarbon therein at a temperature of from about 1300° F. to about 1500° F. in the presence of catalytic particles, forming thereby coke-laden catalytic particles and a gaseous mixture comprising hydrogen and carbon monoxide, continuously withdrawing said gaseous mixture for use as a reducing gas as hereinafter set forth, continuously withdrawing said coke-laden catalytic particles from said reaction zone and passing said particles to a heating zone in the presence of an oxygen-containing gas, heating said catalytic particles in said heating zone to a temperature of from about 1500° F. to about 1700° F. by burning the coke therefrom in the presence of a combustible gas mixture formed as hereinafter set forth, discharging the resulting flue gas, returning the hot, coke-free catalytic particles to said reaction zone maintained at an elevated temperature by the passage of the hot particles therethrough, continuously passing the aforementioned reducing gases to a reducing zone and contacting said gases therein with particles comprising an oxide of a metalliferous steam reducing agent at a temperature of from about 1300° F. to about 1500° F. thereby reducing said particles to a lower state of oxidation, continuously withdrawing the partially spent reducing gases from said reducing zone to be utilized as hereinafter described, passing the last mentioned particles to a hydrogen generation zone wherein they are contacted with steam continuously charged to said hydrogen generation zone, reacting said steam and said particles therein at a temperature of from about 1000° F. to about 1500° F. to form hydrogen and higher oxides of said metalliferous steam reducing agent, recovering the hydrogen product from said hydrogen generation zone, withdrawing said particles in a higher oxidation state and returning them to said reducing zone to further contact reducing gases as previously described, passing a portion of the partially spent reducing gases to said heating zone in combination with an oxygen-containing gas to form the aforesaid combustible gas mixture, recycling excess partially spent reducing gases through the reducing zone in combination with the aforesaid reducing gases from the reaction zone to be further utilized as a reducing gas, and preheating the feed gases to said reducing zone and said hydrogen generation zone by heat exchange with hot flue gas from said heating zone sufficiently to maintain the portion of the process comprising the reducing and hydrogen generation zones essentially isothermal.

References Cited in the file of this patent

UNITED STATES PATENTS

| | | |
|---|---|---|
| 2,198,560 | Marshall | Apr. 23, 1940 |
| 2,425,754 | Murphree et al. | Aug. 19, 1947 |
| 2,449,635 | Barr | Sept. 21, 1948 |
| 2,656,255 | Johnson | Oct. 20, 1953 |
| 2,888,395 | Henny | May 26, 1959 |